(12) United States Patent
Fiebig et al.

(10) Patent No.: US 6,293,024 B1
(45) Date of Patent: Sep. 25, 2001

(54) LEVELING DEVICE

(75) Inventors: Arnim Fiebig, Leinfelden-Echterdingen; David Matzo, Pliezhausen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/476,196

(22) Filed: Jan. 3, 2000

(30) Foreign Application Priority Data

Mar. 31, 1999 (DE) ............................................. 199 14 540

(51) Int. Cl.⁷ ..................................................... G01C 9/00
(52) U.S. Cl. ................ 33/375; 33/286; 33/451; 33/DIG. 21
(58) Field of Search ............................... 33/375, 281, 282, 33/283, 285, 286, 365, 374, 376, 384, 385, 386, 451, DIG. 21

(56) References Cited

U.S. PATENT DOCUMENTS

| | | | |
|---|---|---|---|
| 1,445,570 | * 2/1923 | Tiffany | 33/375 |
| 1,502,255 | * 7/1924 | Lemieux | 33/375 |
| 1,701,069 | * 2/1929 | Frantz | 33/375 |
| 2,521,525 | * 9/1950 | Krausser | 33/375 |
| 2,659,975 | * 11/1953 | Van Gundy | 33/375 |
| 2,746,164 | * 5/1956 | Eitzen | 33/375 |
| 4,067,117 | * 1/1978 | Bernard | 33/375 |
| 5,519,942 | 5/1996 | Webb | 33/281 |

FOREIGN PATENT DOCUMENTS 2 190 745 A  11/1987 (GB).
2 276 451 A   9/1994 (GB).

* cited by examiner

*Primary Examiner*—Christopher W. Fulton
(74) *Attorney, Agent, or Firm*—Michael J. Striker

(57) ABSTRACT

A leveling device has a housing, a support surface which is fixed with the housing, an adjusting device including at least one adjusting screw which is displaceable outwardly and has an adjusting thread which is engageable with a counter thread for adjusting the adjusting screw, the counter thread being formed as a partially side of a slider which is displaceable transversely to a longitudinal axis of the adjusting screw and disengageable from the adjusting thread.

9 Claims, 3 Drawing Sheets

LEVELING DEVICE

BACKGROUND OF THE INVENTION

The present invention relates to a leveling device.

Leveling devices are known in the art. One of such devices is disclosed for example in the U.S. Pat. No. 5,519,942. The leveling device of this patent has a housing, a support surface which is fixed to the housing, an adjusting device. The adjusting device has at least one adjusting screw which can be displaced so that it extends outwardly beyond the support surface. For this purpose the adjusting screw is provided with an adjusting thread which engages with a counter thread in the housing. The adjusting device with the adjusting screw serves for adjusting the leveling device to the desired leveling plane, which is adjustable by means of a water balance formed on the leveling device. This construction however has a substantial disadvantage that the adjusting screw must be screwed back when it must be again returned into the housing so that it no longer extends outwardly beyond the support surface. In the practice, the return points for the operators of the leveling device are frequently omitted, since it is too time consuming and complicated. When the adjusting screw after the use of the leveling device must again extend outwardly beyond the support plane of the support surface, the adjusting screw can be easily damaged. Moreover the leveling device with the extended adjusting screw can not be used as a water balance.

SUMMARY OF THE INVENTION

Accordingly, it is an object of the present invention to provide a leveling device of the above mentioned type which avoids the disadvantages of the prior art.

In keeping with these objects and with others which will become apparent hereinafter, one feature of present invention resides, briefly stated in a leveling device, in which the counter thread engaging with an adjusting thread of the adjusting screw extending beyond the abutment surface is formed as a partial thread on a slider which is displaceable transversely to the longitudinal section of the adjusting screw and is bringable outside of engagement with the adjusting thread.

When the leveling device is designed in accordance with the present invention, it has the advantage that the adjusting screw can be returned in each arbitrary position in a simple manner in the housing of the leveling device, so that every time without great expenses the operation of a water balance is available.

In accordance with a further advantageous feature of the present invention, the adjusting screw after actuation of a releasing key is displaceable back by the spring force. Thereby the one-hand operability of the leveling device remains guaranteed.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
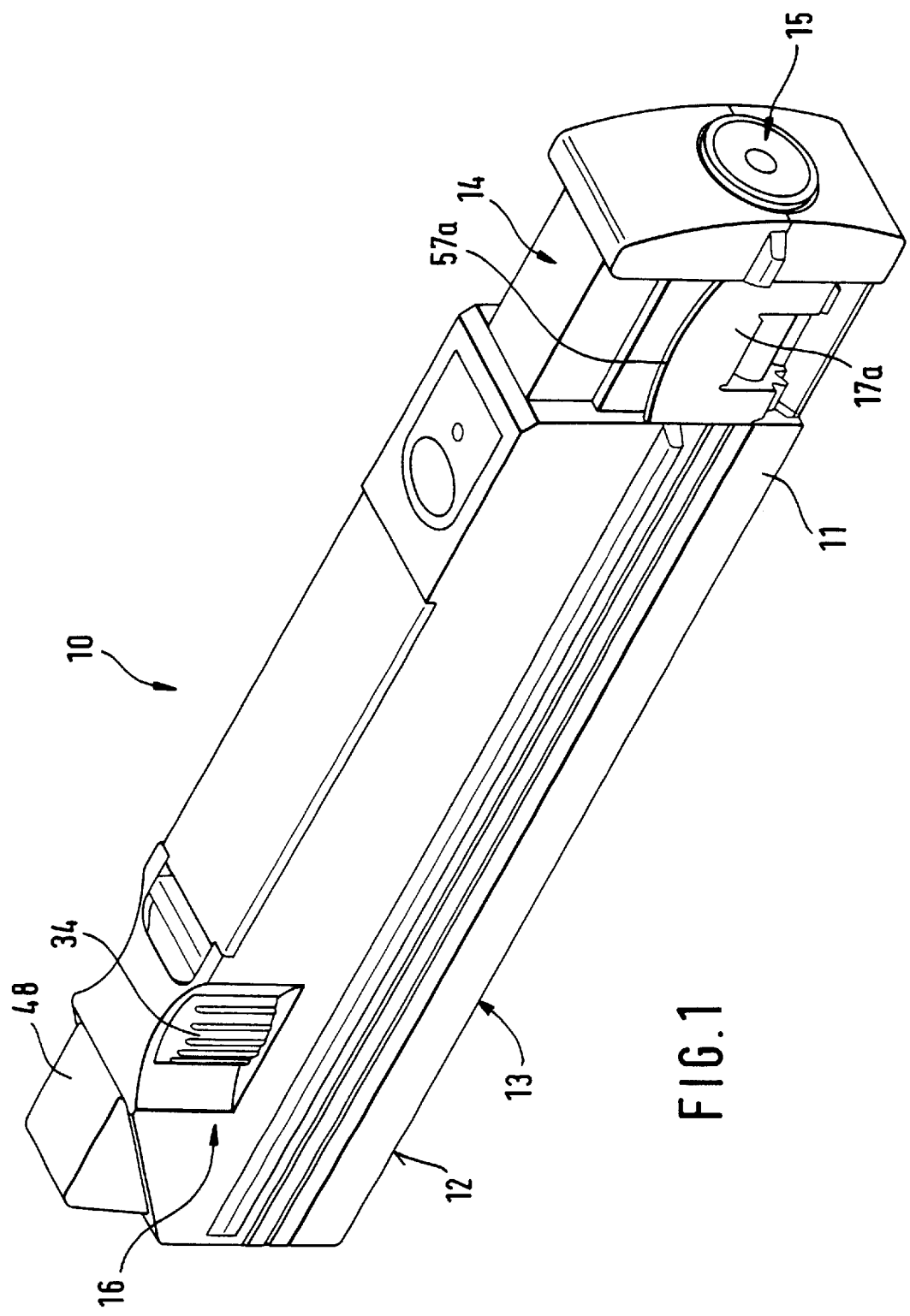
FIG. 1 is a perspective view of a leveling device in accordance with the present invention.

A leveling device in accordance with the present invention is identified with reference numeral 10 in FIG. 1. It has a housing 11 which forms a support surface 13 on a lower side 12.

The leveling device 10 has a level element 14 oriented parallel to the support surface 13. Moreover, the leveling device 10 has a light indicating device 15, which can produce a bundled light beam oriented parallel to the support surface 13. Furthermore, an adjusting device 16 is provided for orienting the support surface 13 relative to the respective substrate, in particular horizontally.

Figure 5:
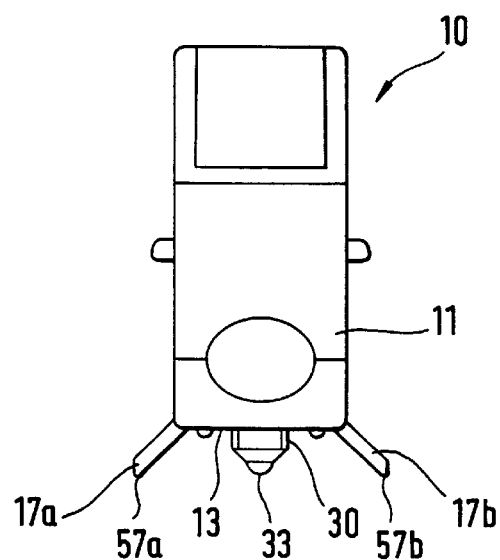
FIG. 5 is a view of the leveling device in accordance with the present invention as seen from the front.

The adjusting device 16 is further provided with two support legs 17a and 17b. They are arranged laterally on the housing and turnable so that they can extend outwardly beyond the support surface 13 as shown in FIG. 5. In FIG. 1 the support legs 17a, 17b are shown in their folded back position. The abutment legs 17a, 17b are substantially plate-shaped and have outwardly curved support edges 57a and 57b.

Figure 2:
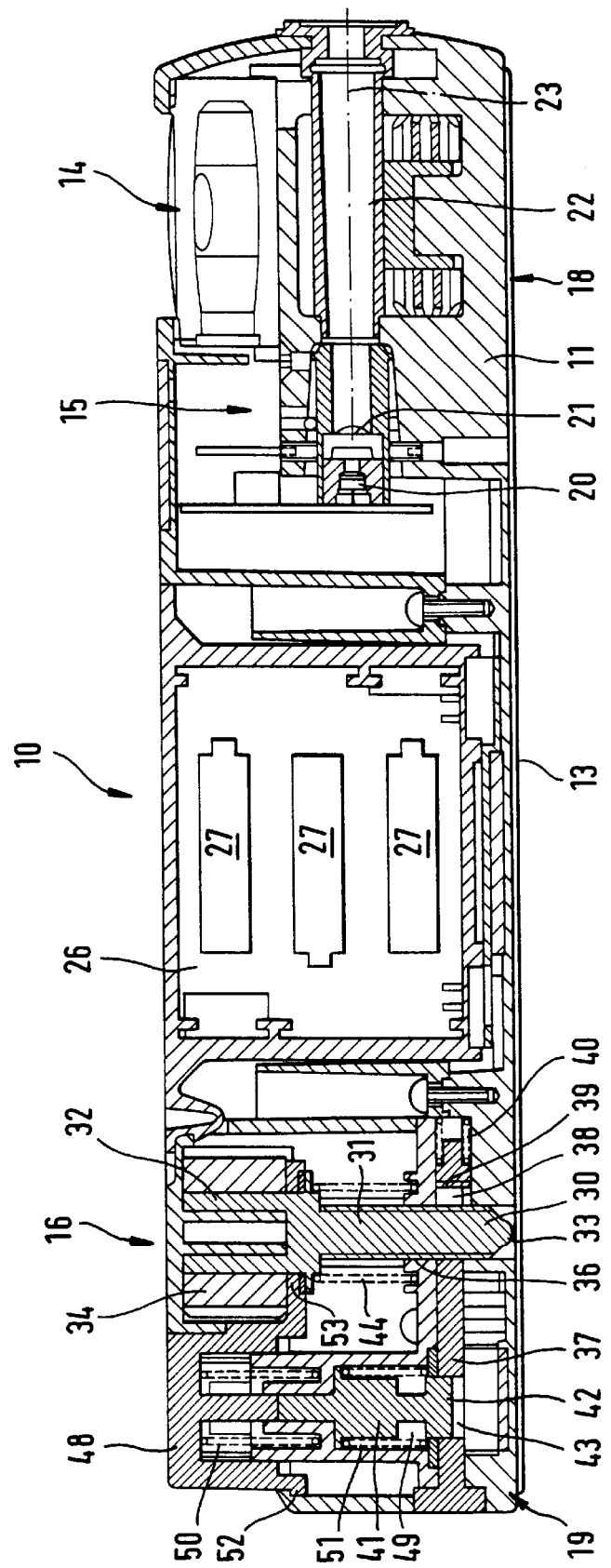
FIG. 2 is a longitudinal section through the inventive leveling device.

In the leveling device 10 shown in FIG. 2 level element 14 extends parallel to the support surface 13. In the front region 18 the leveling device has a light indicating device 15. The light indicating device includes a laser diode 20, a collimation lens 21 and a light outlet passage 22. The path of rays of a light beam produced by the light indicating device 15 is oriented parallel to a longitudinal axis 23 of the leveling device 10, to which also the support surface 13 is oriented parallel.

A battery compartment 26 is located substantially centrally in the housing 11 of the leveling device 10. A battery 27 for the current supply of the light indicating device 15 is accommodated in the battery department 26. The adjusting device 16 is accommodated in a rear region 19 of the leveling device 10 and has an adjusting screw 30 which is arranged substantially transversely to the longitudinal axis 23. In FIG. 2 it is shown in a base position at the housing 11, displaced back behind the support surface 13.

The adjusting screw 30 has a cylindrical shaft part 31 which is provided on the outer periphery with an adjusting thread 36, and also a multi-edge drive part 32. The adjusting screw is form-lockingly coupled via the drive part 32 with an adjusting wheel 34. The adjusting wheel 34 engages partially in the window retained laterally in the housing 11 through the housing 11 and therefore is available for actuation of the adjusting screw 30 by the operator from outside. At the end located near the support surface 13, the adjusting screw 30 forms an adjusting mandrel 33.

A slider 37 is supported displaceable transversely to the displacing direction of the adjusting screw 30 in the housing 11. The slider 37 has a throughgoing opening 38, through which the adjusting screw 30 engages with its shaft part 31. The throughgoing opening 38 is wider than the diameter of the shaft part 31 of the adjusting screw 30, so that the slider 37 is displaceable within certain limits. An inner thread 39 is formed on a wall of the throughgoing opening 38. It is bringable in engagement with the adjusting thread 36. The inner thread 39 is substantially semi circular and forms a partial thread. The slider 37 is pre-tensioned by a pressure spring 40 in the direction toward the engaging position of the inner thread 39 and the adjusting thread 36.

In the arresting position shown in FIG. 2, the slider 37 is blocked by an arresting pin 41 which in this position serves as an abutment for the pretensioning force of the pressure spring 40. The arresting pin 41 engages with its end 42 facing the support surface 13, into the arresting opening 43 in the slider 37. The arresting opening 43 has substantially the same diameter as the slider 37, so that the slider 37 is blocked form-lockingly in the arresting position. In this position the inner thread 39 and the adjusting thread 36 are not in engagement with one another. Simultaneously the adjusting screw 30 is forced by a return spring 44 to a base position in which it is completely withdrawn into the housing. In this base position the support surface 13 is available for the support purposes.

Figure 3:
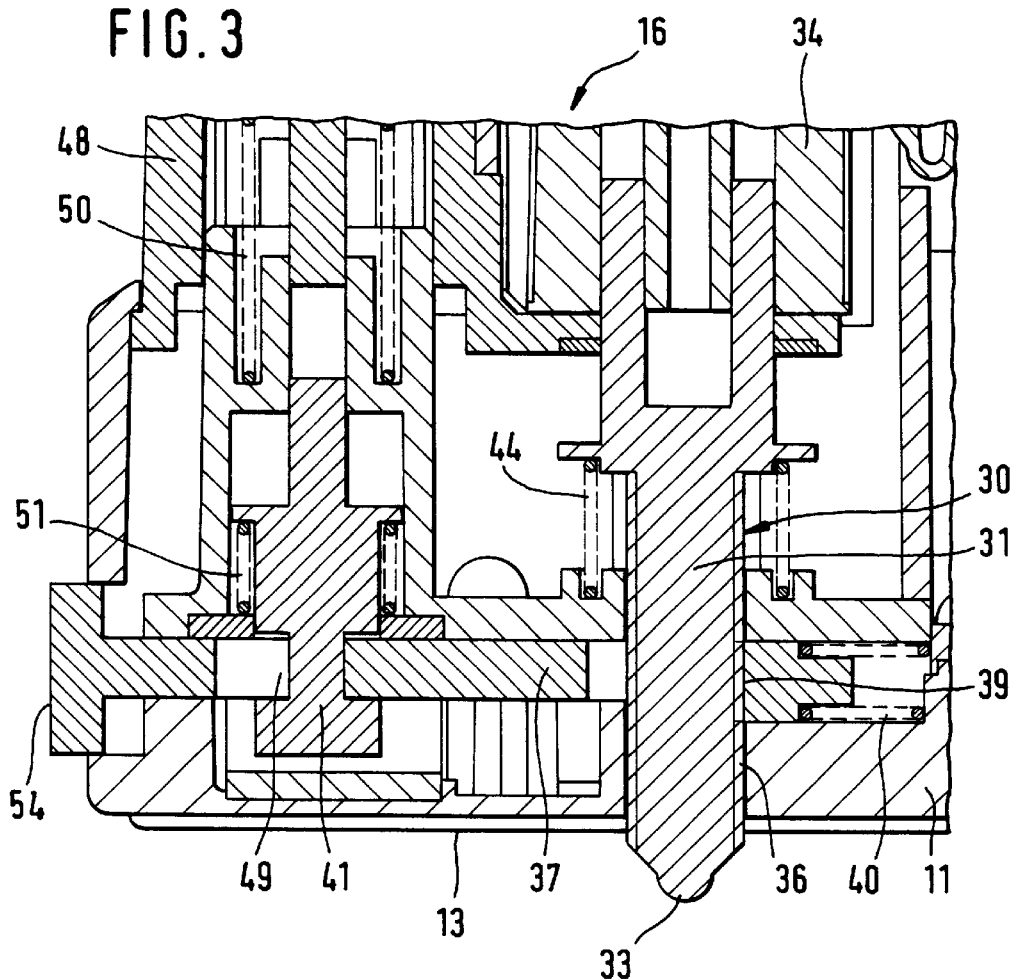
FIG. 3 is a partial section through the inventive leveling device on an enlarged scale when compared with FIG. 2.

A push button 48 is located in a rear region 19 of the leveling device 10, in an extension of the arresting pin 41. The arresting pin 41 is displaceable by the push button 48 from the base position relative to the slider 37. Near a support-side end 42, the arresting pin 41 is provided with a narrowing 49 which is displaceable by the pressing in of the push button 48 at the height of the arresting opening 43. When the narrowing 49 and the slider 37 are in alignment with one another, the slider 37 is released axially, so that the slider 37 is displaced by the force of the spring 40, until the inner thread 39 and the adjusting thread 36 are engaged with one another as shown in FIG. 3. Simultaneously, a first spring 50 is pre-tensioned and loads the push button 48. After releasing of the push button 48, the first spring 50 forces the push button 48 again back to its initial position, and the projections 52, 53 of the push button 48 come to abutment against the corresponding projections on the housing 13. A second spring 51 loads the arresting pin 41 with its return force.

FIG. 3 shows the rear region 19 of the adjusting device 16 in its adjusting position, on a scale which is enlarged when compared with FIG. 2. In this position the thread 36 on the shaft part 11 of the adjusting screw 30 is in engagement with the inner thread 39 on the slider 37. The slider 37 engages on the one hand in the narrowing 49 in the arresting pin 41. In this engaging position, the adjusting screw 30 by turning of the adjusting wheel 34 displaces as a result the thread connection 36/39 against the restoring spring 44, and the abutment mandrel 33 then extends outwardly of the housing 11 and is displaceable outwardly over the support surface 13.

On its end which faces away from the slider 37, its pressure spring 40 has a T-shaped actuation button 54 which extends outwardly of the housing 11. Therefore, the actuation button 54 is accessible for the operator of the inventive machine 10. By pressing the actuating button 54, the operator can displace the slider 37 against the pretensioning force of the pressure spring 40, and the slider is moved back from the narrowing 49 and releases in this way the arresting pin 41. The arresting pin 41 is displaced again to its initial position shown in FIG. 2. The inner thread 39 and the adjusting thread 36 then again engage one another. The return spring 44 forces the adjusting screw 30 automatically back to its base position in the housing 11.

Figure 4:
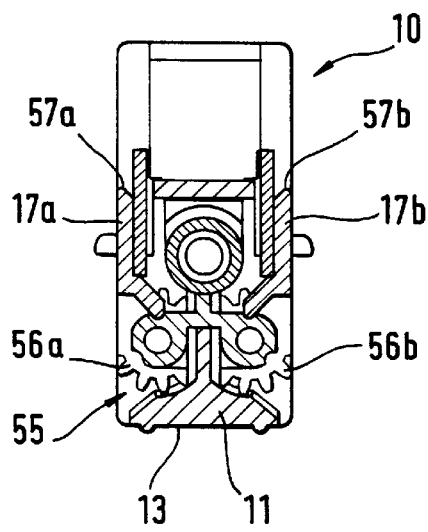
FIG. 4 is a cross-section through the inventive leveling device.

FIG. 4 shows a cross-section through the leveling device 10 in the region of the support leg 17a, 17b. There are total two support legs 17a, 17b on the opposite sides of the housing 11. They are coupled with one another through a toothed gear transmission 55. Each support leg 17a, 17b is non-rotatably connected with a toothed gear 56a, 56b. Thus, by turning a first support leg 17a, 17b the corresponding another abutment leg 17a, 17b is also turned.

FIG. 5 shows the leveling device 10 with the unfolded support legs 17a, 17b which, because of the coupling through the toothed gear transmission 55, are turned always uniformly. The abutment legs 17a, 17b extend outwardly through the support surface 13, so that the leveling device 10 can be placed on any substrate, independently from the support surface 13. This is usable especially in the event of uneven substrates. The adjusting screw 30 which is extended outwardly beyond the support surface 13 is recognizable between both support legs 17a, 17b with the support mandrel 33. Because of the curved support edges 57a, 57b of the support legs 17a, 17b, the leveling device 10 with the turned out abutment legs 17a, 17b is easily adjustable via the adjusting screw 30.

It will be understood that each of the elements described above, or two or more together, may also find a useful application in other types of constructions differing from the types described above.

While the invention has been illustrated and described as embodied in leveling device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. A leveling device, comprising a housing; a support surface which is fixed with the housing; an adjusting device including at least one adjusting screw which is displaceable outwardly and has an adjusting thread which is engageable with a counter thread for adjusting said adjusting screw, said counter thread being formed as a partial thread of a slider which is displaceable transversely to a longitudinal axis of said adjusting screw and disengageable from said adjusting thread.

2. A leveling device as defined in claim 1; and further comprising a pressure spring arranged so that said slider is supported displaceable against a tensioning force of said pressure spring.

3. A leveling device as defined in claim 2, wherein said slider cooperates with an arresting pin which in an arresting position of said slider holds it in a release position, in which said adjusting screw and said counter screw are not in engagement with one another.

4. A leveling device as defined in claim 3; and further comprising a return spring, said adjusting screw in said releasing position being forced by said return spring to an initial position which is rearwardly offset in said housing.

5. A leveling device as defined in claim 3; and further comprising a push button, said arresting pin being displaceable against a spring force by said push button.

6. A leveling device as defined in claim 5, wherein said slider has an arresting opening, said arresting pin engaging in said slider through said arresting opening.

7. A leveling device as defined in claim 2; and further comprising support legs each arranged on said housing on facing away side surfaces, said support legs being outwardly turnable over said support surface and are in operative connection with each other.

8. A leveling device as defined in claim 7; and further comprising toothed gears through which said support legs are in engagement with one another.

9. A leveling device as defined in claim 7, wherein said support legs are plate-shaped and have outwardly curved support edges.

* * * * *